US012061443B2

(12) United States Patent
Ishida

(10) Patent No.: US 12,061,443 B2
(45) Date of Patent: Aug. 13, 2024

(54) TIMEPIECE DIAL AND TIMEPIECE

(71) Applicant: Seiko Instruments Inc., Chiba (JP)

(72) Inventor: Masahiro Ishida, Chiba (JP)

(73) Assignee: Seiko Instruments Inc., Chiba (JP)

( * ) Notice: Subject to any disclaimer, the term of this patent is extended or adjusted under 35 U.S.C. 154(b) by 833 days.

(21) Appl. No.: 16/824,143

(22) Filed: Mar. 19, 2020

(65) Prior Publication Data

US 2020/0310350 A1 Oct. 1, 2020

(30) Foreign Application Priority Data

Mar. 26, 2019 (JP) ................................ 2019-058610

(51) Int. Cl.
*G04B 19/32* (2006.01)
*G04B 19/10* (2006.01)
*G04B 19/12* (2006.01)

(52) U.S. Cl.
CPC ............. *G04B 19/32* (2013.01); *G04B 19/10* (2013.01); *G04B 19/12* (2013.01)

(58) Field of Classification Search
CPC ......... G04B 19/12; G04B 19/10; G04B 19/32
See application file for complete search history.

(56) References Cited

U.S. PATENT DOCUMENTS 3,851,460 A * 12/1974 Piquerez .............. G04G 9/0041 968/215
5,426,621 A * 6/1995 Akasaka ................ G04B 19/32 368/232
5,838,644 A * 11/1998 Yoneda .................. G04B 19/32 368/239
6,512,721 B1 * 1/2003 Amano .................. H05B 33/02 368/227
7,499,380 B2 * 3/2009 Gouthier ................ G04B 19/32 368/228
2006/0133219 A1 * 6/2006 Dubach .................. G04B 19/12 368/232
2008/0159083 A1 * 7/2008 Kawakami ............. G04B 19/12 368/232
2009/0316536 A1 * 12/2009 Kachi ................... G04R 60/12 368/278
2012/0163135 A1 * 6/2012 Takasawa .......... G04B 45/0076 368/232
2020/0201261 A1 * 6/2020 Marlot Doerr ........ G04B 19/10

FOREIGN PATENT DOCUMENTS

JP H11281765 A 10/1999
JP 2002-221921 A 8/2002
JP 2003-222538 A 8/2003
JP 2011-065781 A 3/2011
JP 3185663 U 8/2013

OTHER PUBLICATIONS

Office Action in China Application No. 202010222888.9, including English translation, dated May 11, 2022, 13 pages.
English translation of Notice of Reasons for Refusal in Japanese Patent Application 2019-058640, dated Nov. 4, 2022.

* cited by examiner

*Primary Examiner* — Edwin A. Leon
*Assistant Examiner* — Jason M Collins
(74) *Attorney, Agent, or Firm* — Crowell & Moring LLP

(57) ABSTRACT

A timepiece dial according to embodiments of the invention includes a base member; an exterior portion that is provided on the base member, includes a laminated body of a plurality of layers, and has translucency; and a phosphorescent material that is provided on a rear surface of the exterior portion on a side of the base member.

6 Claims, 6 Drawing Sheets

TIMEPIECE DIAL AND TIMEPIECE

RELATED APPLICATIONS

This application claims priority to Japanese Patent Application No. 2019-058610, filed on Mar. 26, 2019, the entire content of which is incorporated herein by reference.

BACKGROUND OF THE INVENTION

1. Field of the Invention

Embodiments of the invention relate to a timepiece dial and a timepiece.

2. Description of the Related Art

A decoration member and a timepiece provided with a decoration member are disclosed (see JP-A-11-281765), According to the decoration member, a base layer made of a white material is formed on a surface of a dial made of metal, a phosphorescent layer containing a phosphorescent material (phosphorescent fluorescent member) is formed on a surface of the base layer, and a cover layer made of a transparent acrylic resin is formed on a surface of a phosphorescent layer.

However, a material with translucency may be used in an exterior portion of a dial of a timepiece. In a case in which the exterior portion has a one-layer configuration and a phosphorescent coating is applied to a front-side surface or a rear surface of the exterior portion as in the aforementioned related art, a base color tone of the phosphorescent coating before light emission directly appears, and there is a probability that presence of the phosphorescent function is recognizable at sight in a bright place. Also, it is conceivable that since an original texture of the exterior portion is lost due to the application of the phosphorescent coating, a color tone at a bright place is limited. Further, it is conceivable that since a light emitting color of the phosphorescent coating changes due to an influence of a display panel, a light emitting color of the phosphorescent coating is limited. Thus, if the phosphorescent coating is applied to the front-side surface or the rear surface of the one-layer exterior portion with translucency, there is a concern that decorativeness and expressions become poor.

SUMMARY OF THE INVENTION

An object of embodiments of the invention is to promote expression of a color tone of an exterior portion of a dial provided with a phosphorescent function and to make presence of the phosphorescent function indistinguishable at a bright place, in consideration of the aforementioned facts.

According to a first aspect, a timepiece dial includes a base member; an exterior portion that is provided with the base member, includes a laminated body of a plurality of layers, and has translucency; and a phosphorescent material that is provided on a rear surface of the exterior portion on a side of the base member.

Since the exterior portion includes the laminated body of the plurality of layers in the timepiece dial, a minute color phase of the phosphorescent material provided on the rear surface of the exterior portion is not likely appear on a front-side surface of the exterior portion. Therefore, it is possible to promote expression of an original color tone of the exterior portion and make the presence of the phosphorescent function indistinguishable at a bright place.

According to a second aspect, a thickness of the exterior portion changes depending on a position in the timepiece dial according to the first aspect.

Since the thickness of the exterior portion changes depending on a position in the timepiece dial, the translucency of the exterior portion changes depending on the position. Therefore, expression that brightness and a color tone of light emission of the phosphorescent material are caused to change at a dark place can be performed.

According to a third aspect, the timepiece dial according to the first aspect or the second aspect includes a first decorative portion with translucency provided on a front-side surface of the exterior portion.

According to the timepiece dial, it is possible to enhance decorativeness of the exterior portion using the first decorative portion with translucency and to allow for light emission of the phosphorescent material through the first decorative portion. Therefore, it is possible to enhance expandability of decoration.

According to a fourth aspect, the translucency of the first decorative portion changes depending on a position in the timepiece dial according to the third aspect.

According to a fifth aspect, the timepiece dial according to any one of the first to fourth aspects includes a second decorative portion with light blocking properties provided on at least one of the rear surface and a front-side surface of the exterior portion.

According to the timepiece dial, it is possible to make the presence of the phosphorescent material and the second decorative portion indistinguishable at a bright place and to restrict a light emitting region of the phosphorescent material using the second decorative portion with light blocking properties and allow for expression that is different from how the timepiece dial looks like at a bright place when the phosphorescent material emits light at a dark place. Therefore, it is possible to further enhance decorativeness of the exterior portion.

According to a sixth aspect, a timepiece dial includes a base member; an exterior portion that is provided on the base member, includes a laminated body of a plurality of layers, and has translucency; and a phosphorescent material that is provided between the base member and the exterior portion.

Since the exterior portion includes the laminated body of the plurality of layers in the timepiece dial, a minute color phase of the phosphorescent material provided between the base member and the exterior portion is not likely to appear on the front-side surface of the exterior portion. Therefore, it is possible to promote expression of an original color tone of the exterior portion and make the presence of the phosphorescent function indistinguishable at a bright place. Also, the phosphorescent material may or may not be in contact with the exterior portion. In addition, the phosphorescent material may or may not be in contact with the base member.

According to a seventh aspect, a timepiece includes the timepiece dial according to any one of the first to sixth aspects.

According to the timepiece, it is possible to enhance expression and decorativeness of the timepiece dial and thereby to enhance a product value.

DETAILED DESCRIPTION OF THE PREFERRED EMBODIMENTS

Hereinafter, embodiments for implementing the invention will be described with reference to drawings.

First Embodiment

Figure 1:
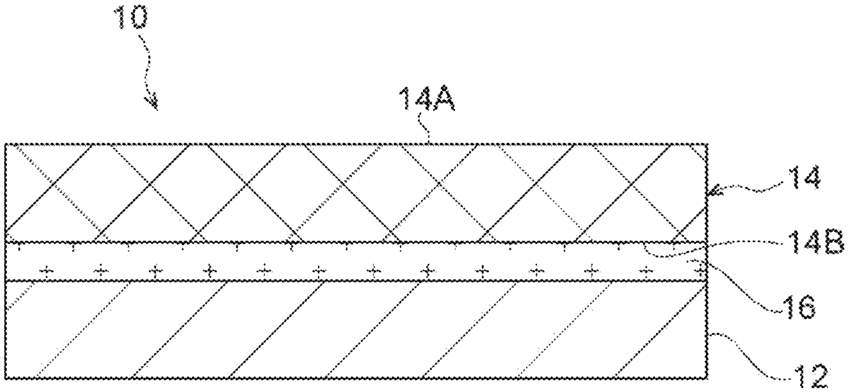
FIG. 1 is an enlarged sectional view illustrating a timepiece dial according to a first embodiment.

In FIG. 1, a timepiece dial 10 according to an embodiment includes a base member 12, an exterior portion 14, and a phosphorescent material 16.

Figure 10:
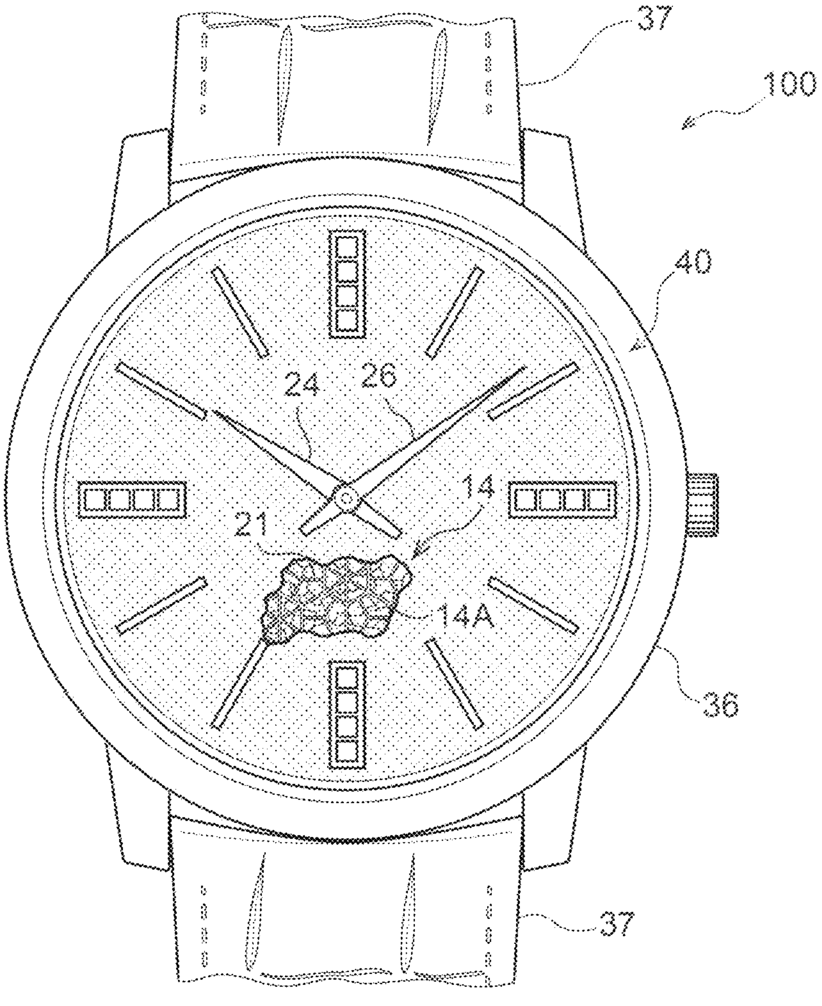
FIG. 10 is a plan view illustrating how the timepiece dial of a timepiece to which the timepiece dial according to the fourth embodiment is applied looks like at a dark place.

The base member 12 is formed into a plate shape, for example, and is formed into various shapes such as a circular shape, an oval shape, a square shape, and a Tonneau shape in accordance with the shape of the timepiece dial 10. As a material of the base member 12, metal or a resin, for example, is used Although illustration is omitted, the base member 12 is disposed on a movement of a timepiece 100 (FIG. 10).

The exterior portion 14 is provided on a partial region or an entire region on the base member 12, includes a laminated body of a plurality of layers, and has translucency. As a material of the laminated body, seashells, marble, ceramic, or the like is used. The thickness of the exterior portion 14 is constant and is about 0.1 mm, for example. The thickness is appropriately changed for adjusting translucency of the exterior portion 14 and adjusting a color tone of the exterior portion 14.

The phosphorescent material 16 is provided on the rear surface 14B of the exterior portion 14 on the side of the base member 12. The phosphorescent material 16 is formed by applying a phosphorescent coating to the rear surface 14B of the exterior portion 14. The phosphorescent material 16 is a compound represented as $MAl_2O_4$, and a metal element represented as M is a phosphorescent fluorescent member that contains as parent crystal a compound of strontium (Sr), magnesium (Mg), and barium (Ba), contains europium (Eu) as an activator agent, and contains dysprosium (Dy) as a co-activator agent.

(Effects)

Since the exterior portion 14 includes the laminated body of the plurality of layer, and light is not allowed to pass directly therethrough as compared with a case in which the exterior portion includes a transparent body of one layer, a minute color phase of the phosphorescent material 16 provided on the rear surface 14B of the exterior portion 14 is not likely to appear on the front-side surface 14A of the exterior portion 14 in the embodiment. Therefore, it is possible to promote expression of an original color tone of the exterior portion 14 and to make the presence of the phosphorescent function indistinguishable at a bright place.

Second Embodiment

Figure 2:
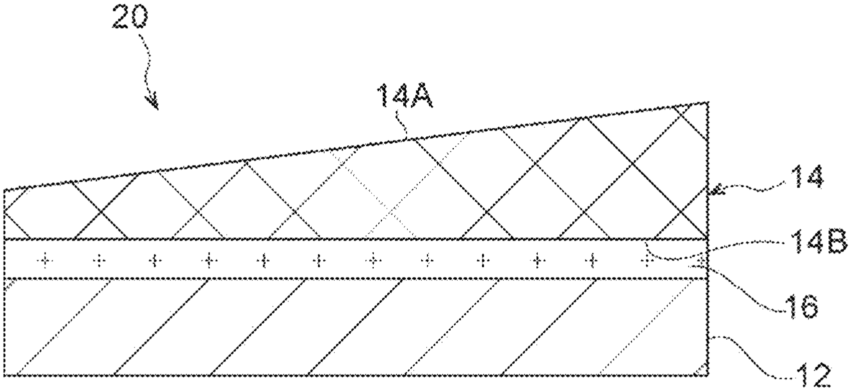
FIG. 2 is an enlarged sectional view illustrating a timepiece dial according to a second embodiment.

In an exterior portion 14 in a timepiece dial 20 according to an embodiment as illustrated in FIG. 2, the thickness of the exterior portion 14 changes depending on a position in the first embodiment. In the example illustrated in the drawing, the thickness of the exterior portion 14 gradually increases along a linear curve from the left side to the right side. Also, the change in thickness is not limited thereto, and the thickness may increase along a quadratic curve. Also, a structure in which the thickness of the exterior portion 14 periodically increases and decreases, for example, may be employed by providing grooves through engraving or the like in the exterior portion 14, for example.

(Effects)

Since the thickness of the exterior portion 14 changes depending on a position, translucency of the exterior portion 14 changes depending on the position in the embodiment. In this manner, expression that brightness and a color tone of light emission of the exterior portion 14 are caused to change depending on a position when the phosphorescent material 16 emits light at a dark place can be performed.

Since the other parts are similar to those in the first embodiment, the same reference numerals will be given to the same parts in the drawings, and description thereof will be omitted.

Third Embodiment

Figure 3:
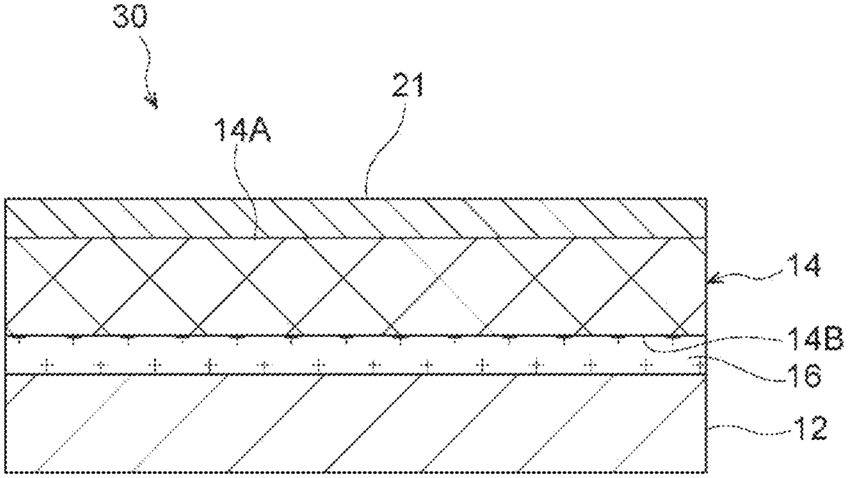
FIG. 3 is an enlarged sectional view illustrating a timepiece dial according to a third embodiment.

In a timepiece dial 30 according to an embodiment as illustrated in FIG. 3, a first decorative portion 21 with translucency is provided on a front-side surface 14A of an exterior portion 14. The first decorative portion 21 is formed through means such as printing, coating, or deposition on the front-side surface 14A of the exterior portion 14. The first decorative portion 21 may be formed of a groove or the like provided by performing engraving or the like on the front-side surface 14A of the exterior portion 14. In the embodiment, the first decorative portion 21 is formed to have a uniform thickness and uniform density.

(Effects)

In the embodiment, it is possible to enhance decorativeness of the exterior portion 14 using the first decorative portion 21 with translucency and to allow for light emission of the phosphorescent material 16 through the first decorative portion 21. In a case in which the light from the phosphorescent material 16 passes through the exterior portion 14 and the first decorative portion 21, how the light is emitted from the front-side surface 14A of the exterior portion 14 is different from that in a case in which the light passes only through the exterior portion 14. Therefore, it is possible to enhance expandability of decoration.

Since the other parts are similar to those in the first embodiment, the same reference numerals will be given to the same parts in the drawings, and description thereof will be omitted.

Fourth Embodiment

Figure 4:
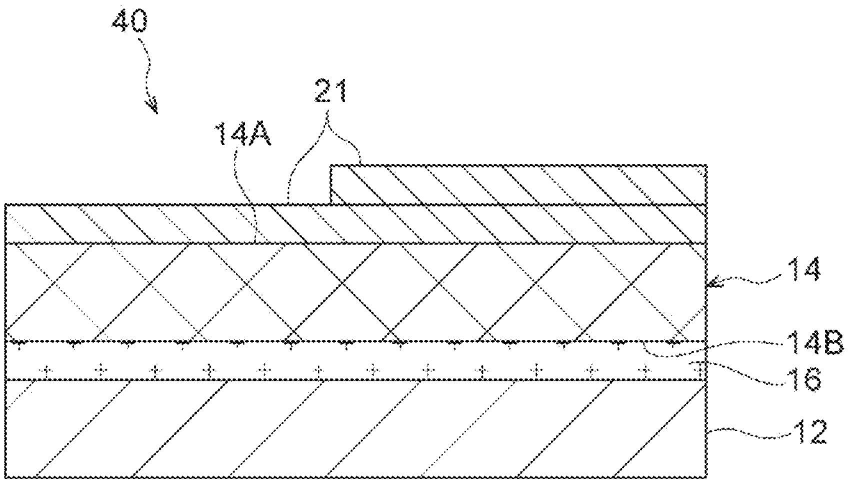
FIG. 4 is an enlarged sectional view illustrating a timepiece dial according to a fourth embodiment.

In a timepiece dial 40 according to an embodiment as illustrated in FIG. 4, translucency of a first decorative portion 21 changes depending on a position in the third embodiment. In the example illustrated in the drawing, the thickness of the first decorative portion 21 in a right-half region is double the thickness of a left-side region. In order to cause the translucency of the first decorative portion 21 to change, density of the first decorative portion 21 may be caused to change depending on a position.

(Effects)

Since the translucency of the first decorative portion 21 changes depending on a position, it is possible to cause brightness and a color tone of light emission of the phosphorescent material 16 to change depending on a position at a dark place in the embodiment. Also, it is thus possible to express gradation, a pattern, and the like.

Since the other parts are similar to those in the first embodiment or the third embodiment, the same reference numerals will be given to the same parts in the drawings, and description thereof will be omitted.

Fifth Embodiment

Figure 5:
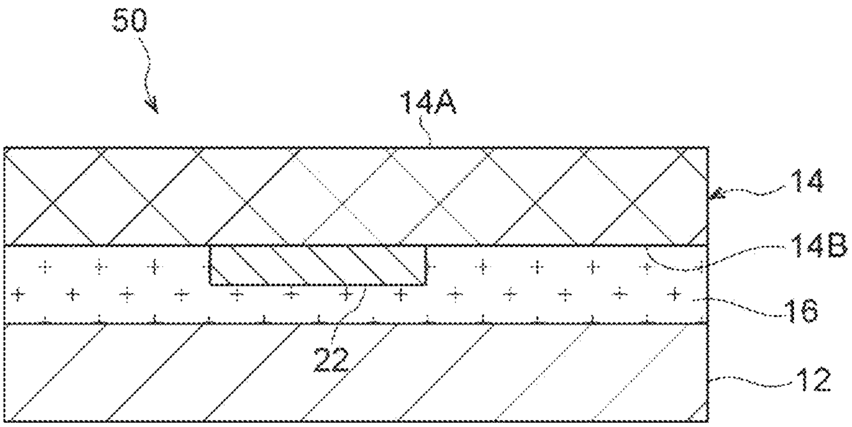
FIG. 5 is an enlarged sectional view illustrating a timepiece dial according to a fifth embodiment.

In a timepiece dial 50 according to an embodiment as illustrated in FIG. 5, a second decorative portion 22 with light blocking properties is provided on a rear surface 14B of an exterior portion 14 in the first embodiment. The second decorative portion 22 is formed through means such as printing, coating, or deposition performed on the exterior portion 14. In the embodiment, the second decorative portion 22 is partially provided near the center of the rear surface 14B of the exterior portion 14. The phosphorescent material 16 is provided on the rear surface 14B of the exterior portion 14 including the rear side of the second decorative portion 22. That is, the phosphorescent material 16 is provided so as to overlap with the second decorative portion 22. Also, the second decorative portion 22 may be provided on the front-side surface 14A of the exterior portion 14 or may be provided on both the front-side surface 14A and the rear surface 14B of the exterior portion 14.

(Effects)

In the embodiment, it is possible to make the presence of the phosphorescent material 16 and the second decorative portion 22 indistinguishable at a bright place, similarly to the first embodiment and to restrict the light emitting region of the phosphorescent material 16 using the second decorative portion 22 with light blocking properties and to allow for expression that is different from how the timepiece dial looks like at a bright place when the phosphorescent material 16 emits light at a dark place. In the example illustrated in FIG. 5, since the second decorative portion 22 is partially provided near the center of the rear surface 14B of the exterior portion 14, light from the phosphorescent material 16 is blocked at the portion of the second decorative portion 22. Therefore, the center region where the second decorative portion 22 is present looks relatively dark in the front-side surface 14A of the exterior portion 14 when the phosphorescent material 16 emits light at a dark place. In this manner, it is possible to further enhance decorativeness of the exterior portion 14 at a dark place according to the embodiment.

Since the other parts are similar to those in the first embodiment, the same reference numerals will be given to the same parts in the drawings, and description thereof will be omitted.

Sixth Embodiment

Figure 6:
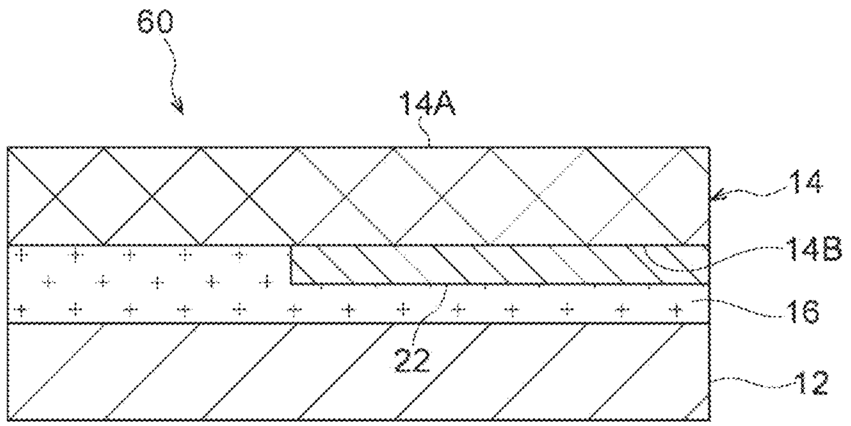
FIG. 6 is an enlarged sectional view illustrating a timepiece dial according to a sixth embodiment.

In a timepiece dial 60 according to an embodiment as illustrated in FIG. 6, a second decorative portion 22 is provided so as to be localized in the right-side region on a rear surface 14B of an exterior portion 14 in the fifth embodiment.

(Effects)

In the embodiment, since the second decorative portion 22 is provided so as to be localized in the right-side region on the rear surface 14B of the exterior portion 14, light from a phosphorescent material 16 is blocked at a portion of the second decorative portion 22. Therefore, the right-side region where the second decorative portion 22 is present looks relatively dark on a front-side surface 14A of the exterior portion 14 when the phosphorescent material 16 emits light at a dark place. In this manner, it is possible to further enhance decorativeness of the exterior portion 14 according to the embodiment.

Since the other parts are similar to those in the first embodiment or the fifth embodiment, the same reference numerals will be given to the same parts, and description thereof will be omitted.

Seventh Embodiment

Figure 7:
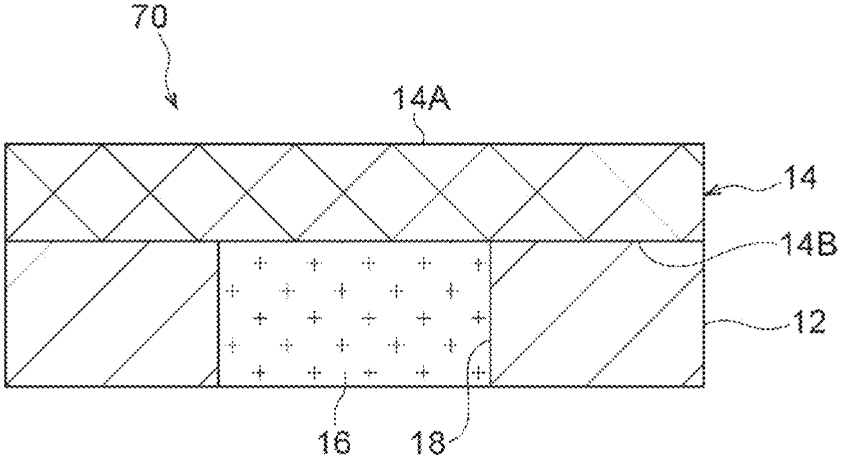
FIG. 7 is an enlarged sectional view illustrating a timepiece dial according to a seventh embodiment.

In a timepiece dial 70 according to an embodiment as illustrated in FIG. 7, an exterior portion 14 is provided on a base member 12 with a hole 18 formed therein. A phosphorescent material 16 is provided on a rear surface 14B of an exterior portion 14 in the hole 18 in the base member 12. Although the thickness of the base member 12 is the same as the thickness of the phosphorescent material 16 in the example illustrated in the drawing, the thickness of the phosphorescent material 16 may be thinner than that of the base member 12.

(Effects)

In the embodiment, since the exterior portion 14 is formed of a laminated body of a plurality of layers similarly to the first embodiment, it is possible to promote expression of a color tone of the exterior portion in the dial provide with the phosphorescent function at a bright place and to make presence of the phosphorescent function indistinguishable. Also, since the portion where the phosphorescent material 16 is present emits light at a dark place, it is possible to realize different expression at a bright place and a dark place.

EXAMPLES

Figure 8:
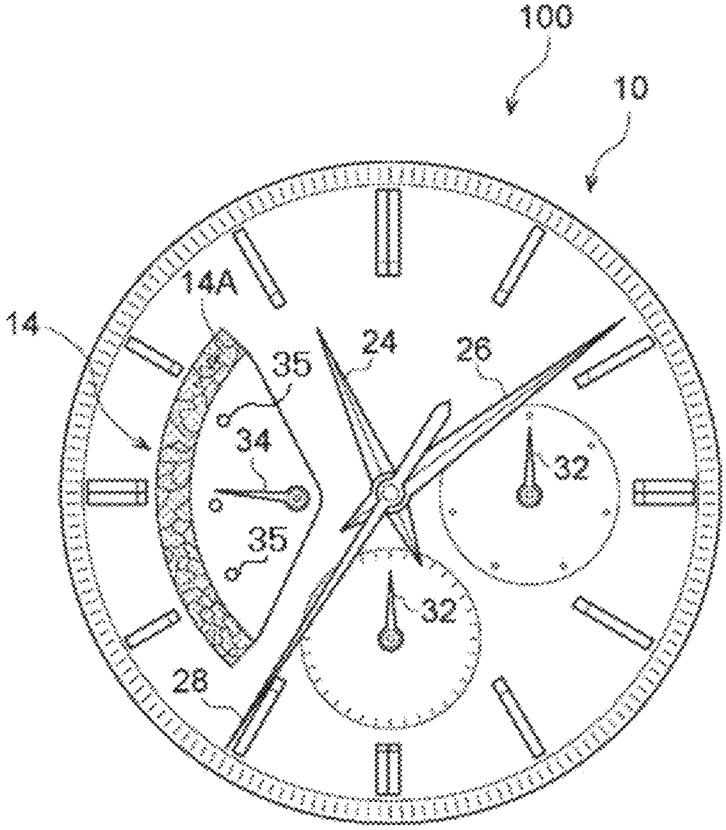
FIG. 8 is a plan view illustrating how the timepiece dial of a timepiece to which the timepiece dial according to the first embodiment is applied looks like at a dark place.

FIG. 8 illustrates how the timepiece dial 10 of a timepiece 100 to which the timepiece dial 10 according to the first embodiment is applied looks like at a dark place. In the timepiece 100, an hour hand 24, a minute hand 26, a second hand 28, two short hands 32, and a hand for displaying power reservation 34 indicating a spring winding state, for example, are provided. The exterior portion 14 is disposed in an arc shape along a scale 35 for displaying power reservation in the timepiece dial 10. As illustrated in FIG. 1, the phosphorescent material 16 is provided on the rear surface 14B of the exterior portion 14. However, since the exterior portion 14 is formed of a laminated body, a minute color phase of the phosphorescent material 16 is not likely to appear on the front-side surface 14A (FIG. 1) of the exterior portion 14, and the presence of the phosphorescent function is not distinguishable at a bright place. Therefore, it becomes easy to express a color tone of the exterior portion 14 at a bright place. Meanwhile, since the entire exterior portion 14 looks like emitting light at a dark place, it is possible to realize a different expression from that at a bright place.

Figure 9:
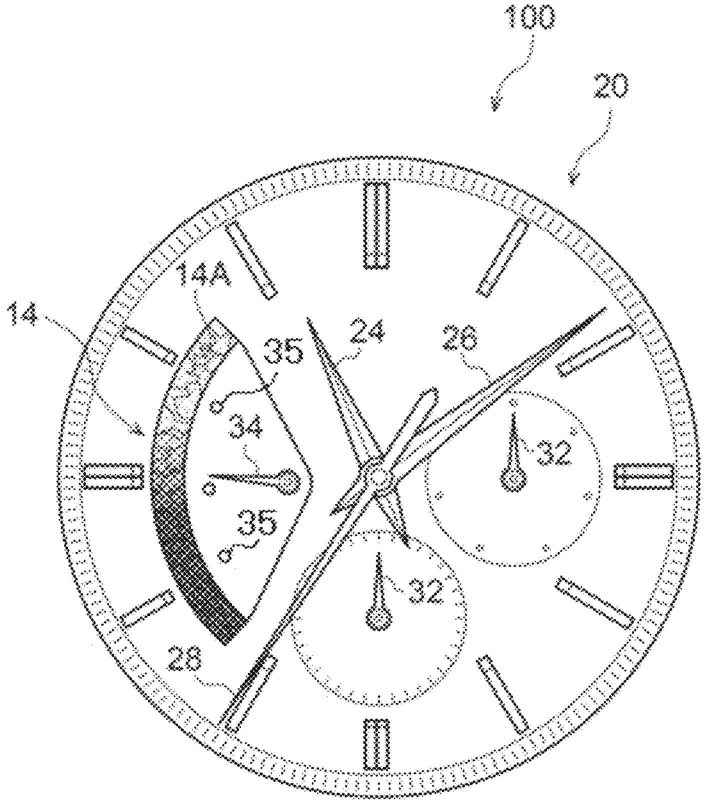
FIG. 9 is a plan view illustrating how the timepiece dial of a timepiece to which the timepiece dial according to the second embodiment is applied looks like at a dark place.

FIG. 9 illustrates how the timepiece dial 20 of a timepiece 100 to which the timepiece dial 20 according to the second embodiment is applied looks like at a dark place. Disposition of an hour hand 24 and the like are similar to that in the example illustrated in FIG. 8. In this example, the thickness of the arc-shaped exterior portion 14 gradually increases toward the counter-timepiece-wise direction. In this manner, the exterior portion 14 looks like emitting light in a gradation manner at a dark place. Meanwhile, the exterior portion 14 looks uniform at a bright place.

FIG. 10 illustrates how a timepiece dial 40 of a timepiece 100 to which the timepiece dial 40 according to the fourth embodiment is applied looks like at a dark place. FIG. 10 illustrates not only the timepiece dial 40 but also a body 36 and a wrist band 37. As hands, only an hour hand 24 and a minute hand 26 are provided. Although the exterior portion 14 is illustrated between the central axis of the hour hand 24 and the position of six o'clock in FIG. 10, the exterior portion 14 is provided on the enter surface of the timepiece dial 40. The first decorative portion 21 has a geometric pattern, for example, and specifically, a hexagonal line and straight lines or the like extending radially from the center of the hexagonal shape are combined. Such a first decorative portion 21. is formed of grooves or the like provided by performing engraving or the like on the surface of the exterior portion 14, for example.

In this example, color phases of the first decorative portion 21 and the phosphorescent material 16 (FIG. 4) do not appear on the front-side surface 14A (FIG. 4) of the exterior portion 14, and presence of the phosphorescent function and the first decorative portion 21 are not distinguishable at a bright place. Meanwhile, the first decorative portion 21 looks as if the first decorative portion 21 floated at a dark place due to light emission from the phosphorescent material 16. Although both the first decorative portion 21 and the exterior portion 14 have translucency, how the exterior portion 14 looks like changes between a portion where the first decorative portion 21 is present and a portion where no first decorative portion 21 is present since the first decorative portion 21 overlaps with the exterior portion 14. Therefore, it is possible to enhance decorativeness.

Figure 11A:
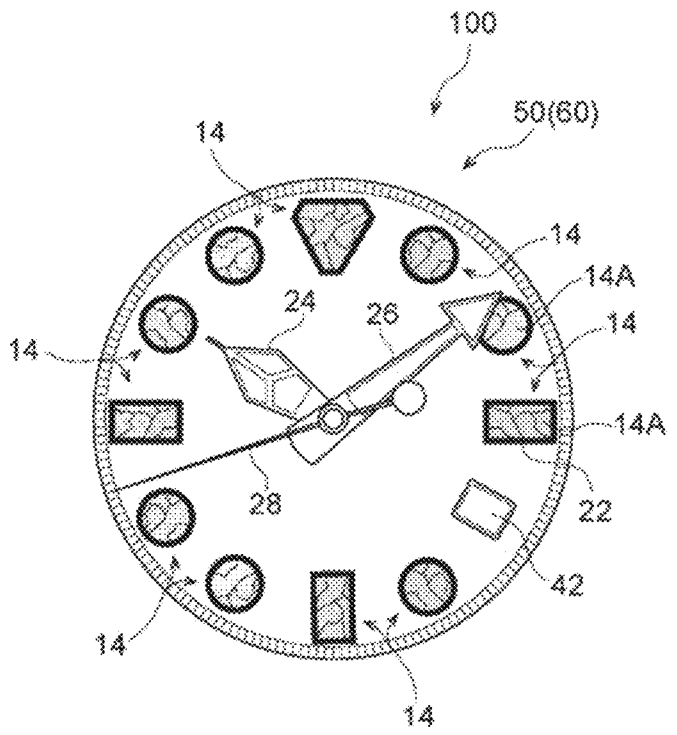
FIG. 11A is a plan view illustrating how the timepiece dial of a timepiece to which the timepiece dial according to the fifth embodiment or the sixth embodiment is applied looks like at a dark place.

FIG. 11A illustrates how the timepiece dials 50 or 60 of a timepiece 100 to which the timepiece dial 50 or 60 according to the fifth embodiment or the sixth embodiment is applied looks like at a dark place. As hands, an hour hand 24, a minute hand 26, and a second hand 28 are provided. In this example, the exterior portion 14 is provided at a portion of each scale from one o'clock to three o'clock and five o'clock to twelve o'clock. At a portion of the scale of four o'clock, a date display window 42, for example, is provided.

Figure 11B:
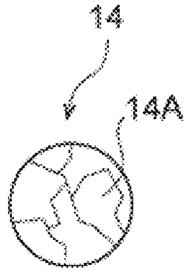
FIG. 11B is an enlarged plan view illustrating how the timepiece dial looks like at a bright place.
Figure 11C:
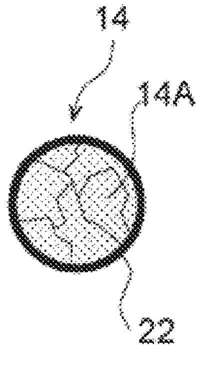
FIG. 11C is an enlarged plan view illustrating how the timepiece dial looks like at a dark place.

In this example, the second decorative portion 22 with light blocking properties is provided so as to overlap the exterior portion 14 along the edge of each exterior portion 14. As illustrated in FIG. 11B, minute color phases of the second decorative portion 22 and the phosphorescent material 16 (FIGS. 5 and 6) do not appear on the front-side surface 14A (FIGS. 5 and 6) on the front side of the exterior portion 14 at a bright place, and the presence of the second decorative portion 22 and the phosphorescent function is not distinguishable at a bright place. Meanwhile, although the exterior portion 14 looks like emitting light due to light emission from the phosphorescent material 16 at a dark place as illustrated in FIGS. 11A and 11C, light is blocked at the portion of the second decorative portion 22 due to its light blocking properties. In this manner, the exterior portion 14 looks like as if it had a black edge. Since the edge, which is not seen at a bright place, looks as if it floated at a dark place, decorativeness of the exterior portion 14 is further enhanced.

In this manner, it is possible to enhance a product value of the timepiece 100 by enhancing expression and decorativeness of the timepiece dial.

Other Embodiments

Although exemplary embodiments of the invention have been described above, the embodiments of the invention are not limited to the above description, and it is a matter of course that various modifications can be made without departing from the gist thereof in addition to the aforementioned embodiments.

The aforementioned respective embodiments can be appropriately combined and used. For example, it is possible to more widely express brightness and a color tone of the light emission from the exterior portion 14 at a dark place by combining the second embodiment and the fourth embodiment.

What is claimed is:

1. A timepiece dial comprising:

a base member formed in conformity with a shape of a dial;

a light transmissive exterior plate that constitutes an exterior of the dial and is provided on the base member, wherein the exterior plate is made of a single material laminated in a plurality of layers;

a phosphorescent material provided directly on a rear surface of the exterior plate between the exterior plate and the base member; and a first translucent decorative portion provided on a front surface, opposite to the rear surface, of the exterior portion, wherein the first translucent decorative portion has a density that differs in the first translucent decorative portion to change a translucency thereof in different areas of the first translucent decorative portion.

2. The timepiece dial according to claim 1, wherein the exterior plate has thicknesses that differ in different areas of the exterior plate that are in direct contact with the phosphorescent material.

3. The timepiece dial according to claim 1, further comprising a second opaque decorative portion that is provided on the rear surface of the exterior plate between the exterior plate and the phosphorescent material.

4. A timepiece comprising the timepiece dial according to claim 1.

5. The timepiece dial according to claim 1, further comprising a second opaque decorative portion located in the phosphorescent material.

6. The timepiece dial according to claim 1, wherein the exterior plate is made of seashells, marble or ceramic.

* * * * *